United States Patent

[11] 3,586,056

| [72] | Inventors | Fred L. Kipp<br>7001 W. 69th St., Overland Park, Kans. 66204;<br>William L. Woodside, 9 N.E. 61st St., Apt. #27, Gladstone, Mo. 64118 |
|---|---|---|
| [21] | Appl. No. | 825,296 |
| [22] | Filed | May 16, 1969 |
| [45] | Patented | June 22, 1971 |

[54] PIPE PLUG
9 Claims, 4 Drawing Figs.

[52] U.S. Cl. ..................................... 138/89,
220/24, 138/97
[51] Int. Cl. ........................................ F16l 55/10
[50] Field of Search ............................ 138/89, 97;
277/188; 220/24 A

[56] References Cited
UNITED STATES PATENTS

| 1,623,843 | 4/1927 | Klinck | 138/89 |
| 1,851,940 | 3/1932 | Williams | 138/89 |
| 2,667,139 | 1/1954 | Campbell | 138/89 X |
| 2,860,019 | 11/1958 | Osmun | 277/188 |
| 3,494,504 | 2/1970 | Jackson | 138/89 X |

*Primary Examiner*—Herbert F. Ross
*Attorney*—Alfred R. Fuchs

ABSTRACT: A pipe plug that is of a generally cylindrical character and has a cylindrical outer surface provided with a flat faced rib extending perpendicularly to the cylindrical surface at one margin of it. A passage extends through the body portion for fluid. Tubular extensions on the body portion are threaded for connection of a cap or of a flexible hose or similar conduit thereto. A clamping member in the form of an annular follower that is L-shaped in cross section has a portion that extends over and surrounds the cylindrical outer surface of the body portion, and a portion that extends inwardly from this portion that is adjustable relative to the body portion by bolts or similar screw-threaded fastening means. A pair of compressible sealing rings with a spacer ring between them, are mounted between the rib and the follower to be compressed by the follower when drawn toward the body portion by the bolts to distort them into sealing engagement with the inner cylindrical surface of a pipe, the plug being entirely inside the pipe with no modification of the pipe or any attachments to the pipe being required for mounting the plug in sealing position in the pipe.

PATENTED JUN22 1971  3,586,056

INVENTORS
FRED L. KIPP
WILLIAM L. WOODSIDE
BY
Alfred R. Fuchs
ATTORNEY

PIPE PLUG

It is the purpose of our invention to provide a plug for sealing off a pipe, which is simple in construction and which has a small number of parts so that an unskilled laborer can readily assemble the same and insert it in the pipe in sealing engagement therewith. The plug comprises a cylindrical body portion that has a cylindrical outer surface. Between it and the inner cylindrical surface of a pipe, sealing means is located. Means for compressing the sealing means comprises a follower that is adapted to clamp the sealing means between an abutment, in the form of an annular rib on the body portion, and a portion of said follower that extends around the body portion, so as to distort the compressible sealing means and force it into sealing engagement with the inner cylindrical surface of the pipe.

More specifically, our invention comprises a pipe plug of the above mentioned character in which the follower is L-shaped in cross section and annular in character, the sealing means are of an annular character, and the means for moving the follower into clamping engagement with the sealing means comprises bolts that act as self-locking means for moving the follower toward the abutment on the body portion and holding it in clamping position with respect thereto.

The sealing means is preferably in the form of a pair of sealing rings that embrace the cylindrical body portion and overlie the cylindrical outer surface thereof with a rigid spacing ring mounted between the compressible sealing rings.

SUMMARY

It is a particular purpose of our invention to provide a pipe plug that has a body portion that has an abutment projecting outwardly from the outer surface thereof, a follower that has a portion mounted on and surrounding the outer surface of the body portion for movement toward and away from the abutment, compressible sealing means mounted on the surface of the body portion in embracing relation thereto, between the abutment and the follower, and self-locking means for moving the follower toward the abutment, said plug being provided for use in combination with a pipe that has a substantially cylindrical inner surface with the cylindrical outer surface of the body portion of the plug spaced inwardly from the cylindrical inner surface of the pipe and with the compressible sealing means mounted between the cylindrical outer surface of the plug and the inner surface of the pipe. Other objects and advantages of our invention will appear as the description of the drawings proceeds.

Figure 1:
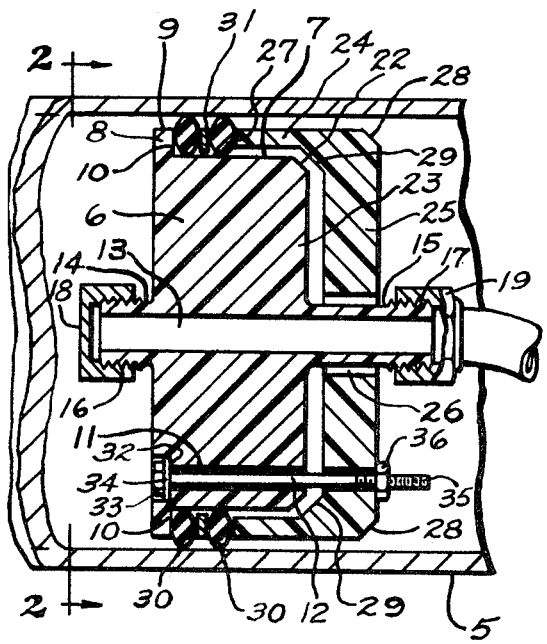
FIG. 1 is a vertical diametrical section through our improved pipe plug showing the same in position in a pipe, and with the sealing means compressed, the section being taken substantially on the line 1–1 of FIG. 2.
Figure 2:
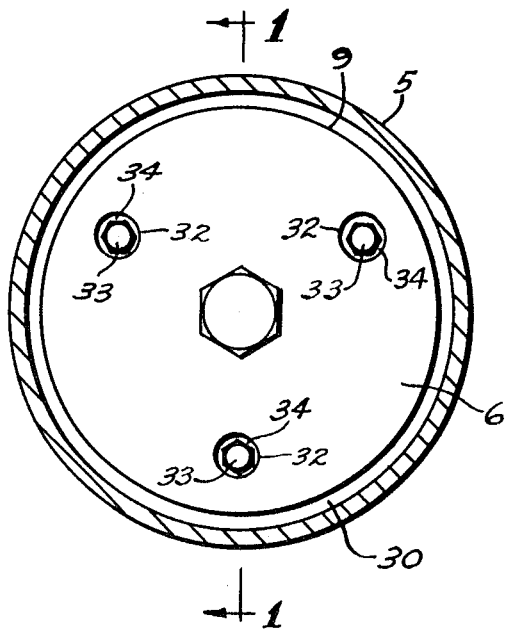
FIG. 2 is a section taken on the line 2–2 of FIG. 1 showing the pipe plug in end elevation.

Referring in detail to the drawings, in FIG. 1 a piece of pipe 5 is shown which is provided with our improved plug which has a body portion 6 of a generally cylindrical character having a cylindrical outer surface 7 and being provided with an outwardly directed rib 8 at one margin of said cylindrical outer surface which rib is annular and which has a cylindrical outer surface 9 and a flat face 10 extending perpendicularly to the cylindrical surface 7. The body portion 6 is further provided with a plurality of transverse openings 11 for bolts 12, the purpose of which will be more fully described below, and with a central or axial transverse passage 13.

Said body portion 6 is further provided with a pair of tubular end extensions 14 and 15 which provide extensions of the passage 13 and which are externally threaded at 16 and 17 for attachment of a sealing cap 18 and a hose connection 19 thereto. While the cap is shown as being attached to the short tubular connection 14 and the hose connection to the longer tubular connection 15, it will be obvious that the cap 18 can be connected to the threaded portion 17 instead of the hose connection 19, if this is desired. The hose connection is used when it is desired to withdraw fluid from the portion of the pipe to the left of the plug and discharge it at some remote point, while the cap 18 can be used on either threaded connection, as may be found desirable, to seal off the portion of the pipe to the left of the plug to prevent escape of fluid from the portion of the pipe at the left of the plug, as viewed in FIG. 1.

Figure 4:
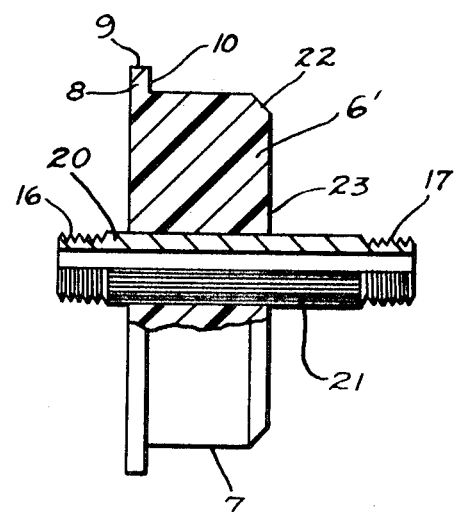
FIG. 4 is a view partly in section and partly in elevation of a modified form of pipe plug body portion.

Instead of providing integral tubular threaded extensions on the body portion of the plug, a passage can be provided in the body portion 6', shown in FIG. 4, and a metal pipe 20 provided extending through said passage, the body portion of the plug being made of a plastic material that is molded around the pipe 20, the pipe 20 being provided with roughening, such as the longitudinal ribs 21, for preventing turning of the pipe in the opening in the body portion, the ends of the pipe being threaded at 16 and 17, as previously described. Both the body portion 6 shown in FIG. 1, and the body portion 6' shown in FIG. 4, are preferably provided with a chamfered portion 22 at the junction of the outer cylindrical surface 7 and the flat end face 23 of said body portion.

Cooperating with the body portion 6 is a follower that has a portion 24 thereof extending parallel to the axis of the body portion that is of a cylindrical character and surrounds the body portion 6 when in operative position, in slightly spaced relation to the cylindrical surface of the body portion, the spacing being somewhat exaggerated in the drawings, and a portion 25 that extends inwardly toward the axis of the annular follower and terminates short of said axis to provide a central opening 26 larger than the tubular extension 15 on said body portion. Said follower has inner and outer cylindrical surfaces on the portion 24 thereof and is provided with an annular flat face 27 at the extremity of the portion 24 thereof, said flat face extending perpendicularly to the cylindrical surface 7 of the body portion. The portion 25 of the follower is so related to the end portion 27 of the portion 24 thereof that when the parts are in position to compress the sealing means, the portion 25 of the follower will be spaced from the face 23 of the body portion. Preferably the follower is provided with a chamfered surface 28 at the junction of the portions 24 and 25 thereof on the exterior thereof and a similar chamfered surface 29 on the inner side thereof.

Figure 3:
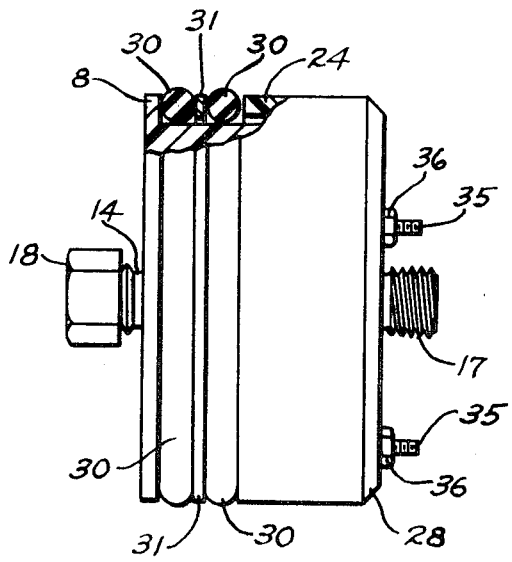
FIG. 3 is a side elevation of our improved pipe plug partly broken away, the sealing means being shown in the position assumed when not compressed.

Mounted on the cylindrical surface 7 in embracing relation thereto, between the flat face 10 of the rib 8 and the flat end face 27 of the follower, are the compressible annular gasket members 30 which are normally circular in cross section, as shown in FIG. 3, but are distortable so as to assume an oval cross section upon being compressed between the portion 24 of the follower and the rib on the body portion of the plug. While the number of sealing gaskets may be varied, as may be desirable, it has been found satisfactory to provide a pair thereof, as shown in FIGS. 1 and 3, with a spacing ring of metal 31 between the same.

The body portion 6 is provided with recesses 32 for the reception of the heads 33 of the bolts 12 and sealing gaskets 34 mounted between the heads 33 and the bottoms of the recesses 32. Said bolts are provided with threaded ends 35 with which the nuts 36 engage. It will be obvious that when the nuts 36 are tightened up on the bolts the follower will be drawn toward the left in FIGS. 1 and 3 and the gaskets 30 compressed, as shown in FIG. 1, so as to distort the gasket members 30 and cause the same to engage the inner cylindrical surface of the pipe 5 tightly in sealing engagement therewith. The bolts 12 and nuts 36 engaging the threaded ends thereof, thus constitute self-locking means for moving the follower toward the abutment provided by the rib 8. It will also be obvious that if desired the cap 18 and the hose connection 19, as well as the bolts 12, can be assembled with the plug before the plug is inserted in the pipe, and that all the operator thereof has to do is to put the plug in position in the pipe and tighten up the nuts 36 to clamp the gasket means 30 in sealing engagement with the pipe.

While the body portion 6 and the follower are shown as being of a rigid plastic material in the drawings, it will be obvious that these parts can be made of a lightweight metal, if this is found to be desirable.

What we claim is:

1. A pipe plug having a body portion having a cylindrical outer surface, an abutment projecting outwardly from the outer surface of said body portion, a follower having a cylindrical portion mounted on said outer surface of said body portion for movement toward and away from said abutment, said cylindrical portion of said follower surrounding said outer surface of said body portion in slightly spaced relation thereto, compressible sealing means mounted on said surface of said body portion in embracing relation thereto between said abutment and follower, said sealing means projecting radially outwardly beyond said abutment of self-locking means for moving said follower toward said abutment, said body portion has externally threaded tubular portions extending therefrom and a fluid passage extending through said body portion and said tubular portions.

2. The pipe plug claimed in claim 1 in which said abutment is an annular rib extending radially outwardly from said outer surface at one margin thereof having a flat face projecting perpendicularly outwardly from said outer surface, said follower is a rigid ring having a flat face directed toward the flat face of said rib and said sealing means is annular.

3. The pipe plug claimed in claim 1 in which said abutment is an annular rib extending radially outwardly from said outer surface at one margin thereof having a flat face projecting perpendicularly outwardly from said outer surface, said follower is a rigid ring having a portion extending parallel to the axis of said cylindrical surface and a portion extending inwardly toward said axis therefrom, said first mentioned portion having a flat face directed toward the flat face of said rib and said sealing means is annular.

4. The pipe plug claimed in claim 1 in which said abutment is an annular rib extending radially outwardly from said outer surface at one margin thereof having a flat face projecting perpendicularly outwardly from said outer surface, said follower is a rigid ring having a portion extending parallel to the axis of said cylindrical surface and a portion extending inwardly toward said axis therefrom, said first mentioned portion having a flat face directed toward the flat face of said rib and said sealing means is annular, and said self-locking means comprises a plurality of screw-threaded members connecting said inwardly extending portions with said body portion.

5. The combination with a pipe having a substantially cylindrical inner surface of a plug mounted entirely within said pipe, said plug having a body portion having a cylindrical outer surface spaced inwardly from the inner surface of said pipe, an abutment projecting from said outer surface of said body portion, a follower having a cylindrical portion mounted on said body portion between said inner surface of said pipe and said outer surface of said body portion, said cylindrical portion of said follower surrounding said outer surface of said body portion in slightly spaced relation thereto, compressible sealing means mounted on said surface of said body portion in embracing relation thereto between said abutment and follower, said sealing means projecting radially outwardly beyond said abutment, and means for squeezing said sealing means between said abutment and said follower, said body portion has externally threaded tubular portions extending therefrom and a fluid passage extending through said body portion and said tubular portions.

6. The combination claimed in claim 5 in which said means for squeezing said sealing means comprises a plurality of screw-threaded members connecting said follower with said body portion.

7. The pipe plug claimed in claim 1 in which said tubular portions and said fluid passage are provided by a pipe extending through said body portion having externally threaded portions projecting from opposite sides of said body portion.

8. The pipe plug claimed in claim 5 in which said tubular portions and said fluid passage are provided by a pipe extending through said body portion having externally threaded portions projecting from opposite sides of said body portion.

9. The combination claimed in claim 5 in which said abutment is an annular rib extending radially outwardly from said outer surface at one margin thereof having a flat face projecting perpendicularly outwardly from said outer surface, said follower is a rigid ring having a flat face directed toward the flat face of said rib and said sealing means is annular.